3,005,913
INFRARED RANGE FINDER
John Strong, Baltimore, Md., assignor to the United
States of America as represented by the Secretary of
the Navy
Filed Sept. 18, 1951, Ser. No. 247,123
8 Claims. (Cl. 250—83.3)

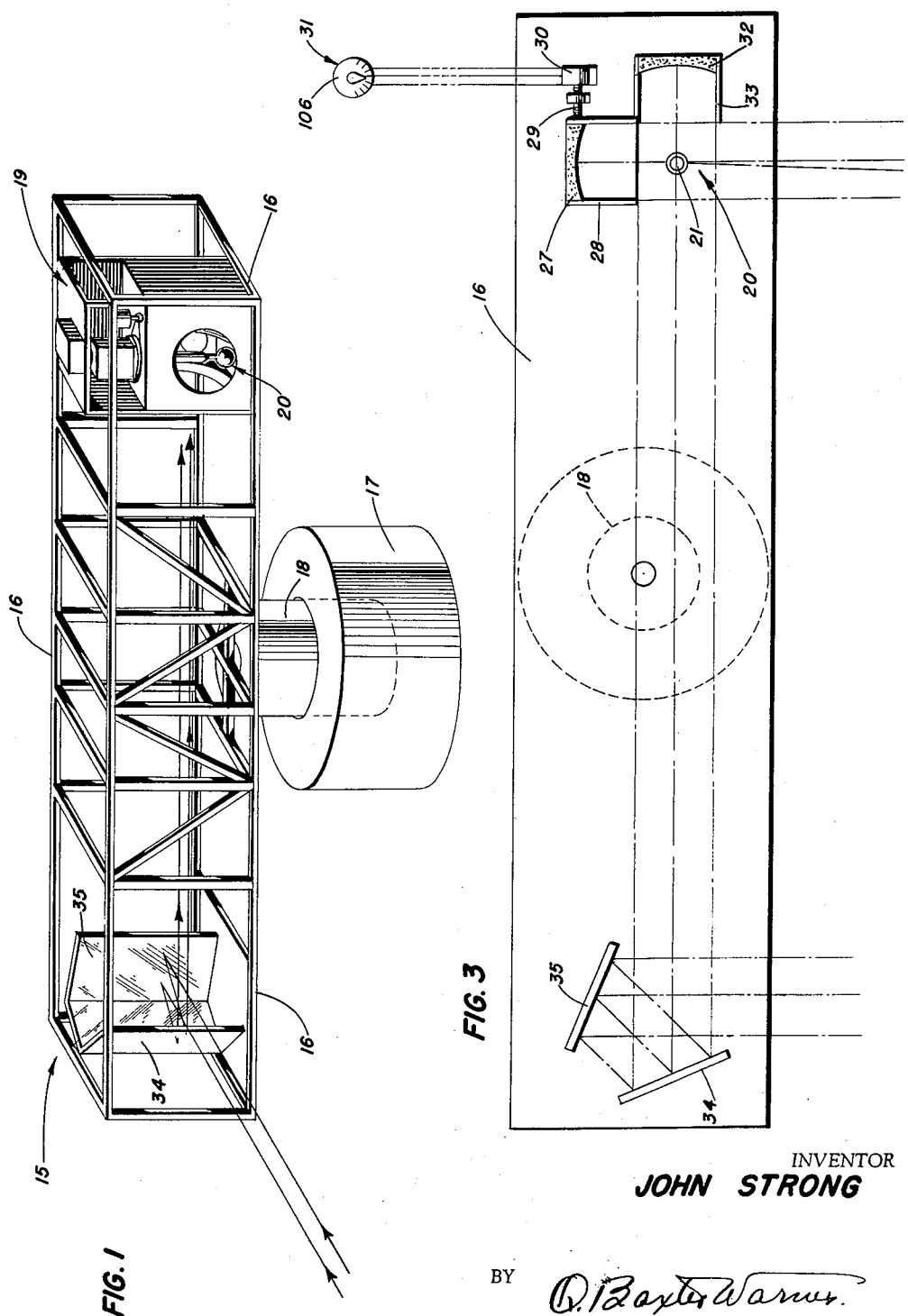

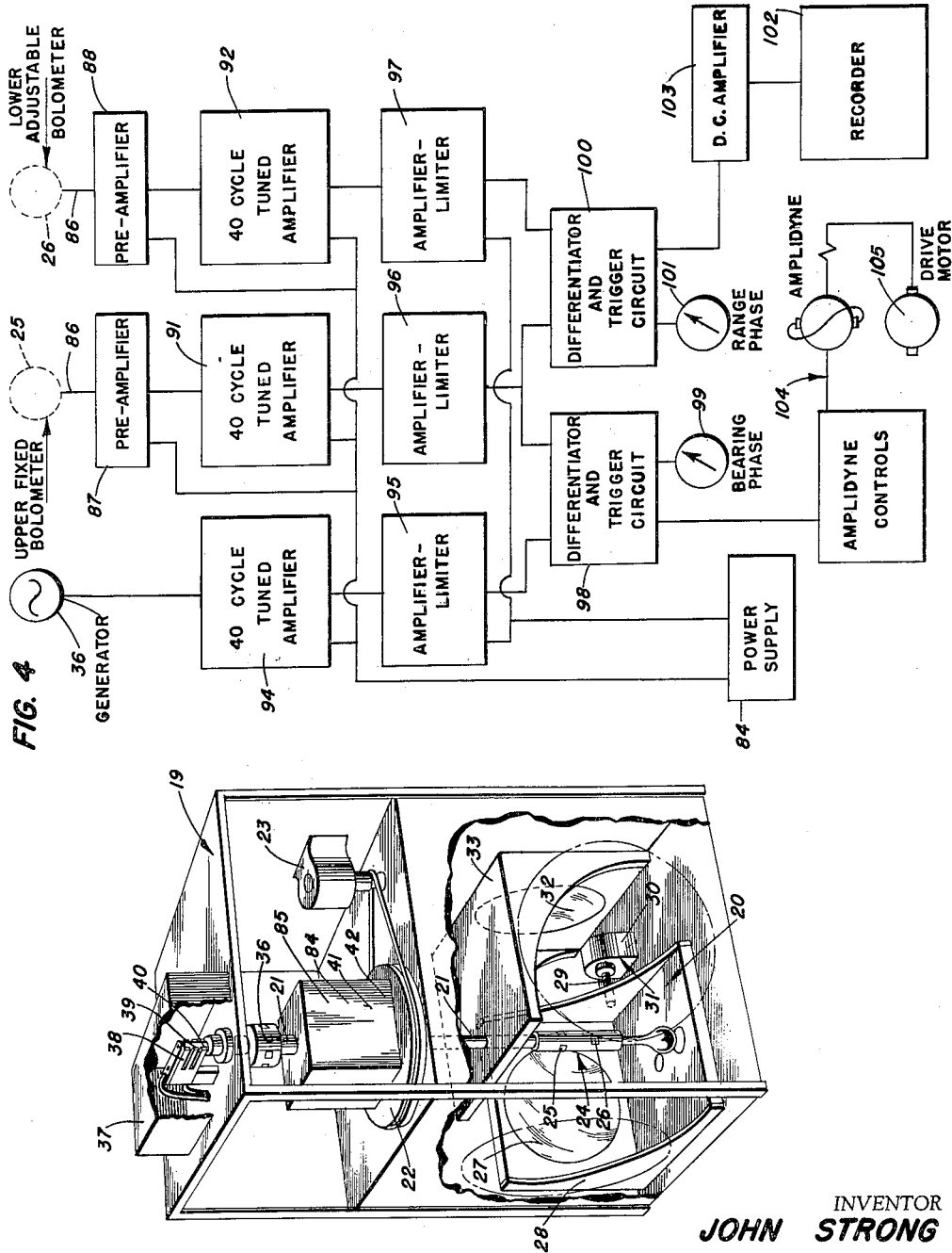

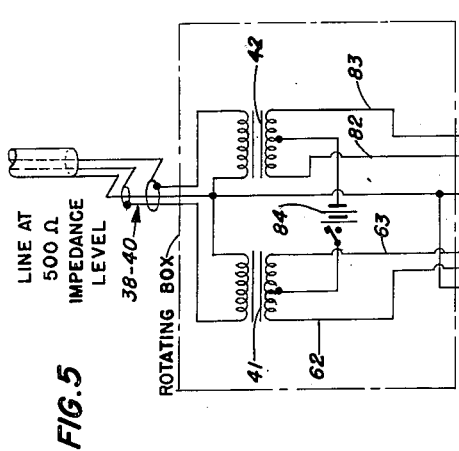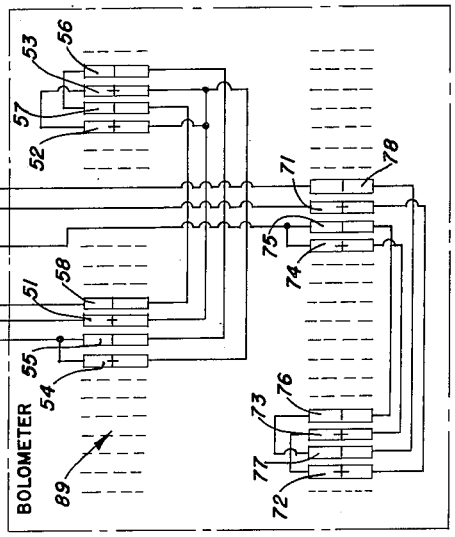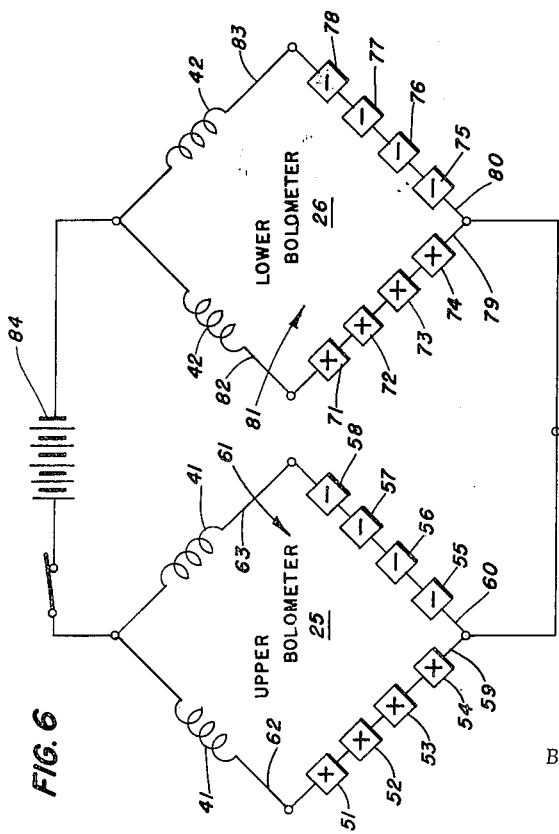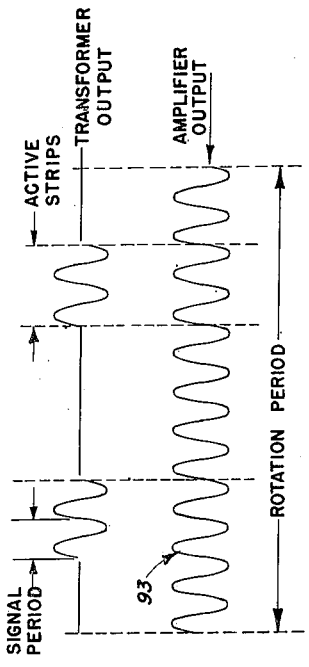

The invention relates to improved methods and apparatus for detecting and locating distant objects which, although invisible, emit weak infrared radiations. More particularly, the invention is concerned with methods and apparatus for naval range finding employing long wave length thermal type infrared radiations.

The primary obejct of the invention is to provide an efficient and accurate method and apparatus for detecting and locating ships which are invisible because of darkness or which are obscured by fog, haze, smoke screens or other conditions.

An important object is to provide an infrared range finder operating on the principle of the conventional optical range finder which determines range from the known length of a base line and the magnitude of a parallax angle.

Another important object is the provision of an infrared ranger finder adapted to measure the parallax angle by a null method.

A further object is to provide an infrared range finder with direction sensitive rotary bolometers adapted to measure the parallax angle by an electrical null method.

A still further object is to provide an infrared range finder with means continuously recording the target path.

Yet another object of the invention is the provision of an infrared range finder with an automatic device for keeping the range finder pointed at the target. The invention also aims to provide an infrared range finder having improved thermometric resistance bridge circuits.

Other objects and advantages of the invention will become apparent during the course of the following detailed description, taken in connection with the accompanying drawings, forming a part of this specification, and in which drawings:

FIG. 1 is a perspective view of the range finder supporting carriage;

FIG. 2 is a perspective view of the dual bolometer and mirror assemblage forming part of the range finder;

FIG. 3 is a diagrammatic view of the range finder optical systems;

FIG. 4 is a block diagram of the range finder electrical system;

FIG. 5 is a developed view of the dual rotary bolometer and its associated circuitry;

FIG. 6 is a diagrammatic view of the thermometric resistance bridge circuits shown in FIG. 5; and FIGS. 7a and 7b are diagrammatic views showing the alternating electric wave form of the bridge output before and after amplification.

This instrument, like a conventional optical range finder, determines range from interocular distance and parallax angle but utilizes bolometers as detectors of infrared target radiations received at spaced points and electronic circuits for translating the detected radiations into indications of angular deviations in range finder pointing.

In the drawings, which for the purpose of illustration show only a preferred embodiment of the invention, and wherein similar reference characters denote corresponding parts throughout the several views, the numeral 15 generally designates the range finder which includes an elongated skeleton frame 16 supported on a cylindrical concrete base 17 for horizontal swinging movement about a pivot 18. Mounted in the right end of the frame 16 as shown in FIG. 1 is a box-like chassis 19 containing a bolometer and mirror assemblage 20 as depicted in FIG. 2. Journaled in the chassis 19 is a vertical shaft 21 provided with a flywheel 22 driven at a reduced speed by a synchronous motor 23. Coaxially affixed to the lower end of the shaft 21 is a cylindrical dual bolometer assemblage 24 including upper and lower squirrel-cage bolometers 25, 26. Each squirrel-cage bolometer consists of a number of very thin blackened nickel strips constituting thermometric resistors arranged in spaced parallel relation as elements of a cylinder.

Radiation is focussed on the lower bolometer 26 by a fast parabolic mirror 27 mounted in a pivoted radiation shield 28 for swinging movement about the vertical axis of the cylindrical bolometer assemblage 24. In ranging, this mirror 27 is adjusted to point directly at the target by rotation of a micrometer tangent screw 29 at the back of the radiation shield 28, this tangent screw being remotely controlled through a synchronous motor 30 forming part of a suitable Selsyn drive 31.

Radiation is focussed on the upper bolometer 25 by a second parabolic mirror 32 fixedly mounted in a nonadjustable radiation shield 33 and pointing along the range finder frame to a double mirror 34, 35 which redirects its view toward the target. The double mirror 34, 35 virtually separates the fixed mirror or eye 32 from the adjustable mirror or eye 27 by a base line or interocular distance substantially equal to the length of the range finder frame. The radiation shields 28, 33 are adapted to restrict the view of each bolometer to its own parabolic mirror and to exclude radiations reflected from the other parabolic mirror.

Connected to the bolometer shaft 21 is a pilot generator 36 driven at the same angular velocity as the upper bolometer 25. Concealed within a metal housing 37 atop the chassis 19 are suitable slip rings 38—40 transmitting signals from the rotating bolometer assemblage 24 via transformers 41, 42 as illustrated in FIG. 5.

Referring to FIGS. 5 and 6 for details of the circuitry connecting the bolometer assemblage 24 with the slip rings 38—40, it is clear that the upper bolometer 25 comprises eight thermometric resistors 51–58 serially connected to form two arms 59, 60 of a Wheatstone bridge 61 wherein the other two arms 62, 63 are provided by two halves of the primary winding of the transformer 41. Likewise, the lower bolometer 26 comprises eight thermometric resistors 71, 78 serially connected to form two arms 79, 80 of a second Wheatstone bridge 81 wherein the other two arms 82, 83 are provided by two halves of the primary winding of the transformer 42. The two Wheatstone bridges 61, 81 are connected in series so that a common battery 84 can supply both bolometers 25, 26 with current. Mounted on the flywheel 22 as shown in FIG. 2 is a box 85 housing the battery 84 and transformers 41, 42.

The thermometric resistors which comprise the bridge arms are individually matched so that each is of approximately the same resistance. Thus, in the absence of irradiation, the bridges are balanced. The opposite current flow in the two halves of each transformer primary produces opposing fields in the transformer cores that prevent saturation.

It will be understood that irradiation of any one of the thermometric resistance strips forming part of one bridge leg will polarize the bridge output in one sense whereas irradiation of a strip in the adjacent bridge leg will polarize the bridge output in an opposite sense. In the drawing, the strips of adjacent bridge legs are marked "+" and "—," respectively, to indicate their opposite polarization effects on bridge output. In assembling the bolometers, the strips marked "+" are mounted alternately with intervening strips marked "—." Consequently, as the target image is scanned by the thermometric resistance strips, alternating unbalance occurs in each bridge. The resultant alternating voltages appearing across the primary windings of the transformers induce in the secondary windings alternating currents which are carried by the line 86 to the preamplifiers 87, 88 shown in FIG. 4. The turns ratio of the transformers is chosen to match the bolometer impedance to that of the line.

Each bolometer consists of two groups of four active strips, these groups being separated by two groups of eight blank positions indicated in FIG. 5 by vertical broken lines 89. Consequently, when each bolometer scans the target image, the bridge transformer output signals will, as shown in FIG. 7a, each consist of a coherent wave train of two full cycles followed by a gap equivalent to four cycles and then another wave train of two more full cycles, no signal being produced when the target image traverses the blank positions. The transformers 41, 42 are however connected through the preamplifiers 87, 88 to amplifiers 91, 92 that are sharply tuned and have a long time constant so that each amplifier output is a continuous wave train 93, as shown in FIG. 7b.

Inasmuch as the sensitivity of a bolometer is approximately inversely proportional to the square root of the total number of active thermometric resistance strips, a six-strip bolometer may be advantageously used instead of the present 24-strip bolometer.

Referring to the block diagram shown in FIG. 4, it will be seen that signals from the generator 36 are transmitted to a third tuned amplifier 94 and the outputs of all three amplifiers 91, 92, 94 are individually applied to amplifier-limiters 95—97, respectively. The outputs of the amplifier-limiters 95, 96 in the generator and upper bolometer channels, respectively, are impressed on a differentiator-trigger circuit 98 provided with a meter 99 calibrated in target deviation angles and adapted to detect any phase difference between the generator and upper bolometer signals. Likewise, the outputs of the amplifier-limiters 96, 97 in the upper and lower bolometer channels, respectively, are impressed on a second differentiator-trigger circuit 100 provided with a meter 101 calibrated in range and adapted to detect any phase difference between the upper and lower bolometer signals. These combinations of two amplifier-limiter channels followed by a differentiator and trigger circuit are referred to as phasemeters. The range phasemeter is connected to operate a range recorder 102 through a suitable D.C. amplifier 103.

The output of the target deviation phasemeter is applied to an amplidyne circuit 104 controlling a drive motor 105 which orients the whole range finder about its pivot in such a direction as to point the double mirror 34, 35 at the target, thus reducing the target deviation angle to zero.

In the operation of the automatic target following device, when the double mirror 34, 35 is correctly trained on the target, the target image is focussed by the mixed parabolic mirror 32 centrally of the adjacent surface of the upper bolometer. As each thermometric resistor sweeps through the target image, it is heated by the target radiation. The thermometric resistance strips are so connected that successive heating thereof produces a small alternating voltage in the Wheatstone bridge circuits. If the double mirror 34, 35 is not trained directly on the target, the radiations will arrive along some other path and the target image will be formed at some point displaced from the middle of the bolometer surface adjacent the mirror 32. The angle between the radiation path and the direction of pointing of the double mirror is called the guide angle.

The circuitry of the upper bolometer and generator channels measures this small image displacement, and therefore the guide angle, in the following manner. Each resistance strip arrives at the off-center position somewhat earlier or later than at the center position. Consequently, the alternating voltage wave produced by the target image in the off-center position will be shifted in time which is a measure of the image displacement. The amount of this time shift is determined by comparing the upper bolometer signal with a reference signal produced by the generator. The comparison is performed by the target deviation phasemeter units 95, 96, 98 whose D.C. output voltage is proportional to the image displacement. This voltage operates the amplidyne system controlling the drive motor 105 which angularly adjusts the whole range finder about its pivot 18 in such a direction as to train the double mirror 34, 35 on the target and reduce the target deviation or guide angle to zero.

When the automatic target following device is operating correctly, therefore, the fixed optical system of the range finder is kept pointing directly at the target. Referring now to the arrangement for setting the adjustable optical system of the range finder, it is clear that the range phasemeter units 96, 97, 100 compare the alternating voltage signals produced by the upper and lower bolometers 25, 26, and that the D.C. output voltage of this phasemeter is zero when the fixed and adjustable optical systems of the range finder are both pointed correctly at the target. By means of the Selsyn system 31, the operator remotely sets the adjustable mirror to a position wherein the voltage output of the range phasemeter is reduced to zero. The operator then reads, by observation of a suitable dial 106 on the Selsyn transmitter calibrated in range, the amount of displacement required for proper setting of the mirror.

Various changes may be made in the form of invention herein shown and described without departing from the spirit of the invention or the scope of the following claims.

What is claimed is:

1. In a range finder of the character described, first and second directionally sensitive systems adapted to receive radiant energy from a target, said systems having axes spaced the length of a base line and defining a parallax angle when directed toward a target, the axis of said second system being angularly adjustable relative to said base line to define any one of a plurality of parallax angles related to target range, first and second rotary bolometer assemblages adapted to translate radiant energy received by said first and second systems into alternating electric signals of a given frequency upon synchronous rotation of said bolometer assemblages, means synchronously rotating said bolometer assemblages, means indicating the phase relationship of said first and second bolometer assemblage signals, and means indicating the angularly adjusted position of said second system.

2. In a range finder of the character described, two directionally sensitive radiant energy receivers each comprising an axially rotatable cylindrical bolometer assemblage including a plurality of alternate and intervening thermometric resistors circumferentially disposed in said cylindrical bolometer assemblage, two spaced optical systems having axes relatively adjustable to different angles of parallax and each adapted to transmit target radiated energy to a different one of said bolometer assemblages, means synchronously axially rotating said bolometer assemblages to successively irradiate said thermometric resistors, two bridge circuits each including two adjacent resistive legs one including the alternate thermometric resistors of one of said bolometer assemblages and the other leg including the intervening thermometric resistors of said one bolometer assemblage whereby said bridge circuits are alternately unbalanced as the bolometer resistors are sequentially irradiated, and means indicating the phase relationship of the alternating output signals of said bridge circuits in terms of target range.

3. In a range finder of the character described, two rotary radiant target energy detectors each including an electrical bridge having thermometric resistors, two spaced directionally sensitive, directionally adjustable systems guiding said radiant target energy during detector rotation toward said thermometric resistors in predetermined sequence thereby to produce in the outputs of said bridges alternating electric signals of the same frequency, and means measuring the phase relationship of said alternating electric signals in terms of target range.

4. In a range finder of the character described, two rotary radiant target energy detectors each including an electrical bridge having thermometric resistors, two spaced directionally sensitive, directionally adjustable systems guiding said radiant target energy during detector rotation toward said thermometric resistors in predetermined sequence, means synchronously rotating said detectors thereby to produce in the outputs of said bridges alternating electric signals of the same frequency, and means measuring the phase relationship of said alternating electric signals in terms of target range.

5. In a range finder of the character described, two rotary radiant target energy detectors each including an electrical bridge having thermometric resistors, two spaced directionally sensitive systems having relatively adjustable axes, each system being adapted during rotation of said detectors to direct radiant target energy in sequence toward the thermometric resistors of a different one of said electrical bridges, means synchronously rotating said detectors thereby to produce in the outputs of said bridges alternating electric signals of the same frequency, means relatively adjusting the axis of said systems to correspond to any one of a plurality of known parallax angles, and means measuring the phase relationship of said alternating signals in terms of target range.

6. In a range finder of the character described, a rotor having first and second annular zones, means driving the rotor, first and second electrical bridges each having adjacent legs each including a series of thermometric resistors, the resistors of adjacent legs of said first and second bridges being mounted in circumferentially spaced sections respectively of said first and second annular zones with the resistors of each adjacent leg alternating with intervening resistors of its companion leg, first and second optical systems adapted to transmit radiant target energy along optical axes to zones of irradiation each lying in a different one of said annular zones to produce alternating signals at the outputs of said bridges upon turning of said rotor, means adjusting the direction of the axes of said systems to coincide with any one of a plurality of known parallax angles whereby at least one of said zones of irradiation is shifted to vary the phase of the alternating output signal of at least one of said bridges, and means indicating the phase realtionship of said alternating signals in terms of target range.

7. In equipment of the character described, an angularly adjustable support, a directionally sensitive system adapted to receive radiant target energy, said system having an axis and being mounted on said support for angular adjustment therewith to permit pointing toward said target, an alternating signal generator of reference frequency mounted on said support, a rotary bolometer assemblage adapted to receive radiant energy from said optical system and translate said received radiant energy into alternating signals of said reference frequency upon rotation of said bolometer assemblage synchronously with said generator, means synchronously driving said bolometer assemblage and said generator, and means responsive to a phase difference between said generator signal and said bolometer signal adapted to angularly displace the support toward a position wherein said system is pointed toward the target.

8. In a range finder of the character described, first and second directionally-sensitive optical systems adapted to transmit radiant energy, said systems having optical axes spaced on a base line and defining a parallax angle when directed toward a target, said second optical system being angularly adjustable relative to the base line to define any one of a plurality of parallax angles related to target range, an alternating reference frequency signal generator, first and second rotary bolometer assemblages respectively adapted to receive radiant energy from said first and second optical systems and thereupon to produce alternating signals of said reference frequency upon rotation of said bolometer assemblages synchronously with said generator, means synchronously driving said bolometer assemblages and said generator, means mounting said range finder for bodily angular adjustment whereby the optical axis of said first optical system is shiftable toward and away from target bearing position, means responsive to a phase difference between said generator signal and said first bolometer assemblage signal adapted to angularly displace the range finder toward a position wherein said first optical system is pointed toward the target, and means measuring the phase relationship of the alternating signals of said bolometer assemblages in terms of target range.

References Cited in the file of this patent
UNITED STATES PATENTS

| | | |
|---|---|---|
| 2,334,085 | Graves et al. | Nov. 9, 1943 |
| 2,412,165 | McDermott | Dec. 3, 1946 |
| 2,431,625 | Tolson | Nov. 25, 1947 |